(12) United States Patent
Viaud

(10) Patent No.: US 7,918,069 B2
(45) Date of Patent: Apr. 5, 2011

(54) BALER WITH WRAPPING ARRANGEMENT FOR ENVELOPING A BALE WITH AN ENVELOPING MATERIAL

(75) Inventor: Jean Viaud, Gray (FR)

(73) Assignee: Deere & Company, Moline, IL (US)

( * ) Notice: Subject to any disclaimer, the term of this patent is extended or adjusted under 35 U.S.C. 154(b) by 793 days.

(21) Appl. No.: 11/611,223

(22) Filed: Dec. 15, 2006

(65) Prior Publication Data

US 2007/0169441 A1 Jul. 26, 2007

(30) Foreign Application Priority Data

Jan. 26, 2006 (DE) .................. 10 2006 003 690

(51) Int. Cl.
*B65B 63/04* (2006.01)
*B65B 63/00* (2006.01)
(52) U.S. Cl. ....................................... 53/118
(58) Field of Classification Search ............ None
See application file for complete search history.

(56) References Cited

U.S. PATENT DOCUMENTS

| 4,366,665 | A | | 1/1983 | VanGinhoven et al. |
| 4,407,113 | A | | 10/1983 | Core |
| 5,495,700 | A | * | 3/1996 | Stauber et al. .................. 53/118 |
| 5,729,953 | A | | 3/1998 | Fell et al. |
| 7,143,565 | B2 | * | 12/2006 | Haws et al. .................. 53/133.4 |
| 2004/0020172 | A1 | * | 2/2004 | Biba et al. ........................ 53/478 |

FOREIGN PATENT DOCUMENTS

| DE | 36 34 571 | 4/1988 |
| DE | 197 20 489 | 11/1998 |
| EP | 1 186 562 | 3/2002 |

OTHER PUBLICATIONS

European Search Report, Apr. 2, 2007, 5 Pages.

\* cited by examiner

*Primary Examiner* — Rinaldi I. Rada
*Assistant Examiner* — John Paradiso

(57) ABSTRACT

Providing in conjunction with a large round baler is a wrapping arrangement for enveloping a large round bale with an enveloping material. The wrapping arrangement includes a propulsion element, preferably a propulsion roll, that withdraws the enveloping material from a supply, preferably in the form of a roll, and a clutch arrangement effectively connected to the propulsion element. The clutch arrangement is arranged to maintain the force acting upon the enveloping material generally at a constant level once the enveloping material is grasped by the bale during the wrapping process.

8 Claims, 3 Drawing Sheets

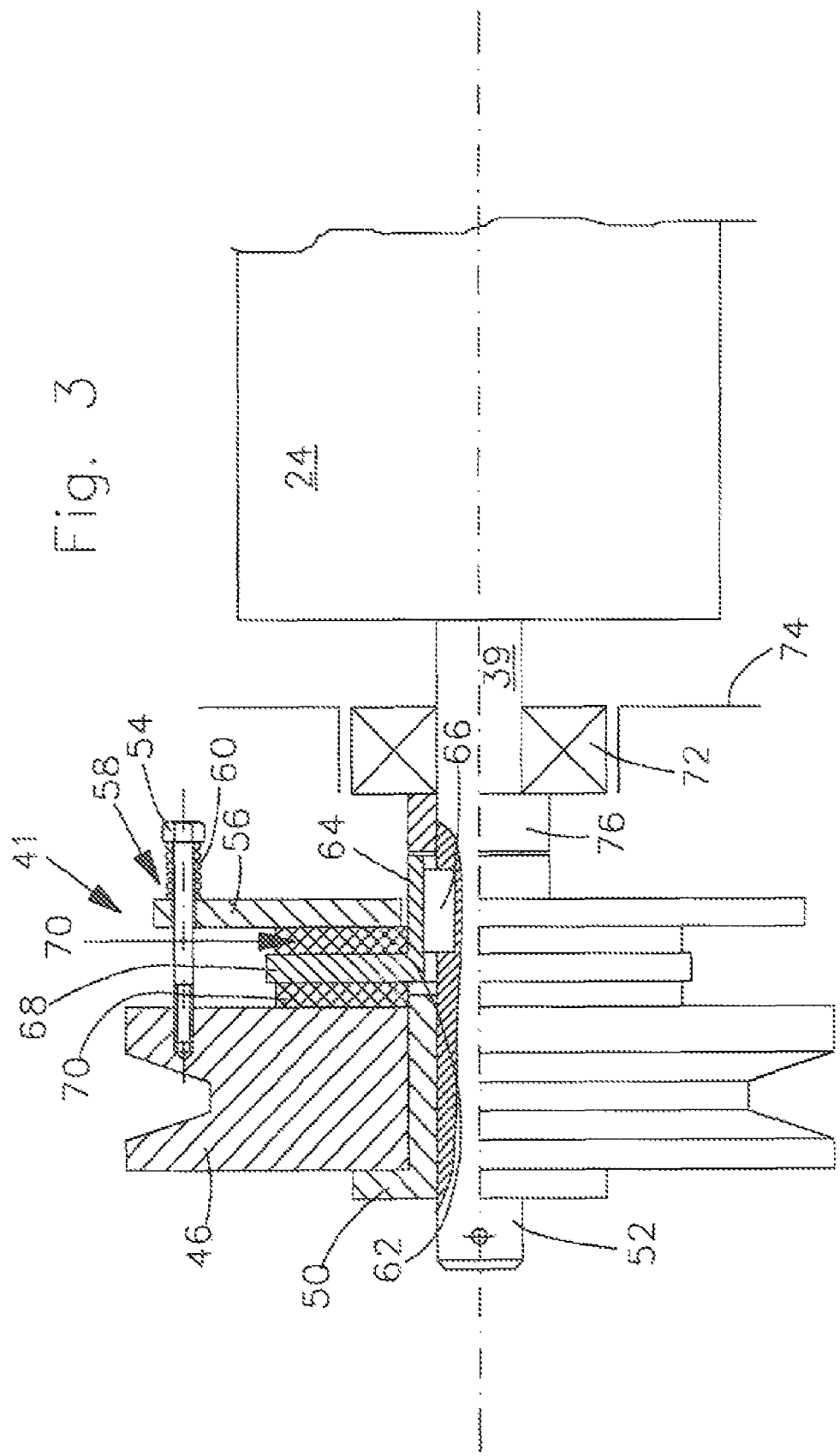

BALER WITH WRAPPING ARRANGEMENT FOR ENVELOPING A BALE WITH AN ENVELOPING MATERIAL

FIELD OF THE INVENTION

The invention concerns a wrapping arrangement for the enveloping of a bale with an enveloping material and including a propulsion element, preferably a propulsion roll that withdraws the enveloping material from a supply, preferably in the form of a roll, and a clutch arrangement effectively connected to the propulsion element, and a baler with such an arrangement.

BACKGROUND OF THE INVENTION

DE-A1-197 20 489 shows a baler for agricultural harvested crop with a station for withdrawing a band of enveloping material from a supply. The withdrawal station is provided with a brake arrangement operating on the principle of centrifugal force as a speed control arrangement, so that the enveloping material is under a predetermined tension during the wrapping of the cylindrical bale and the separating process.

The problem underlying the invention is seen in the fact that such an arrangement for the enveloping of a bale is very costly.

SUMMARY OF THE INVENTION

This problem is solved according to the invention, by the teaching of patent claims 1 or 9, where the further patent claims cite characteristics that further develop the solution to great advantage.

In this way the invention proposes a wrapping arrangement for the enveloping of a bale with an enveloping material, with the arrangement including a propulsion element that withdraws the enveloping material from a supply, preferably in the form of a roll, and a clutch arrangement effectively connected to the propulsion element. The propulsion element is preferably a propulsion roll that can be driven in rotation. However, other configurations are also conceivable. The clutch arrangement is arranged to maintain an essentially constant level of the force applied to the enveloping material as it is grasped by the bale so that the enveloping material can envelop the bale in an optimum manner regardless of the actual circumferential velocity and thereby the force applied to the enveloping material by the bale is dependent upon the harvested crop actually processed and its condition, for example, its moisture content and/or the existing surrounding conditions. The arrangement can regulate or control the force.

If the propulsion element is driven at a velocity that is less than the circumferential velocity of the bale, then a stretching or tensioning of the enveloping material, which has one end grasped by the bale, can be attained so that can adhere closely to the bale.

As previously noted, the circumferential velocity of the bale may depend upon various different factors. Particularly, in the case of dry and/or coarse harvested crop, it frequently is far lower than usually assumed theoretically. In order to attain an adequate stretching or tensioning of the enveloping material, provision can be made for the circumferential velocity of the propulsion element to be lower than the circumferential velocity of the bale by more than 10%, but preferably by approximately 30% or even more.

If the clutch arrangement is configured in the form of a slipping clutch, the clutch can slip as soon as a predetermined force is applied to the enveloping material. Thereby an excessive stretching and/or loading of the enveloping material can be avoided even if the difference in the circumferential velocities is selected to be a very high value.

Provision can be made for the force to be defined as a fixed value. However, a flexible reaction to the actual conditions or requirements is possible, in particular if the force can be adjusted, for example, by varying the preload on the clutch arrangement. In the case of a slipping clutch, for example, a determination can be made at what force the clutch begins to slip or slips completely when the friction coefficient of the clutch is reached or is exceeded. In each case, the preload can be applied by an appropriate spring, for example, in the form of a compression spring or any other appropriate energy storage device, such as by hydraulic or pneumatic means.

If the clutch arrangement establishes an effective connection between a drive arrangement and the propulsion element, then the force transmitted by the clutch arrangement can be a function of the force occurring or the circumferential velocity of the bale in such a way that it opposes it selectively or permits it, so that the force applied to the enveloping material is held at least essentially constant.

The drive arrangement may include a gearbox or any other arrangement that is appropriate for the of force or movement. On balers to which an arrangement according to the invention will usually be applied, drives with tensioning devices are frequently found already among others in the form of chain drives and in particular belt drives.

If a belt drive is provided, then the clutch arrangement can interact at least with a belt drive pulley of the bet drive gearbox and permit, for example, a transmission of force or movement from the bet drive pulley to a drive shaft in such a way that the force applied to the enveloping material is held constant.

A wrapping arrangement for the wrapping of a bale can be applied in industry to balers that form bales of paper, garbage, textiles etc. But such a wrapping arrangement is particularly appropriate in an application to agricultural balers for basics of agricultural harvested crops, since these are usually coupled to a towing vehicle and must be monitored by an operator of the towing vehicle. For these operators, faulty operation of a wrapping arrangement are difficult to determine and a frequently discovered only after ejection of the bale.

BRIEF DESCRIPTION OF THE DRAWING

The drawings show an embodiment of the invention that shall be described in greater detail in the following.

FIG. 3 shows the clutch arrangement of FIG. 2.

DESCRIPTION OF THE PREFERRED EMBODIMENT

Figure 1:
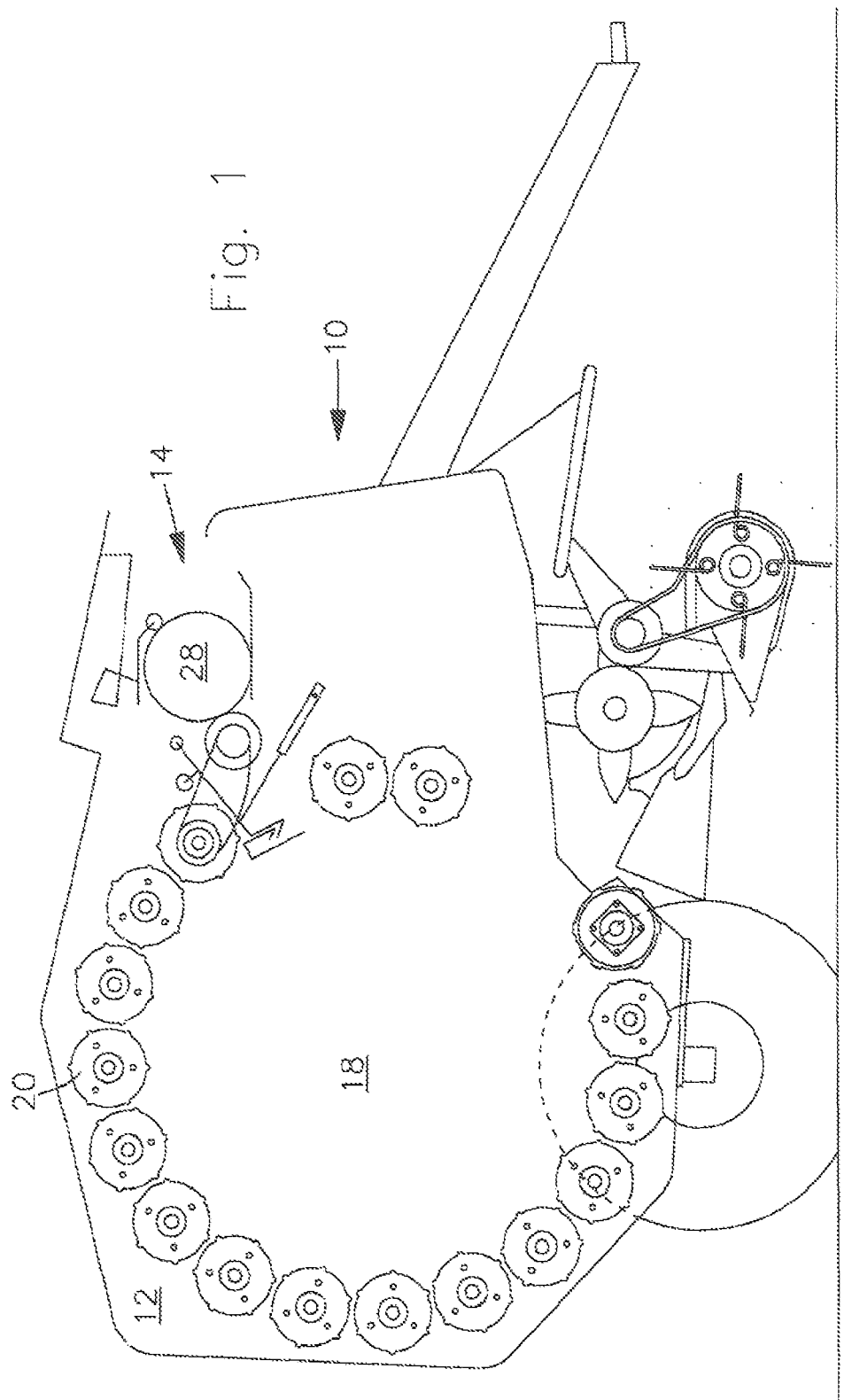
FIG. 1 shows a baler with a wrapping arrangement for the wrapping of a bale with an enveloping material.
Figure 2:
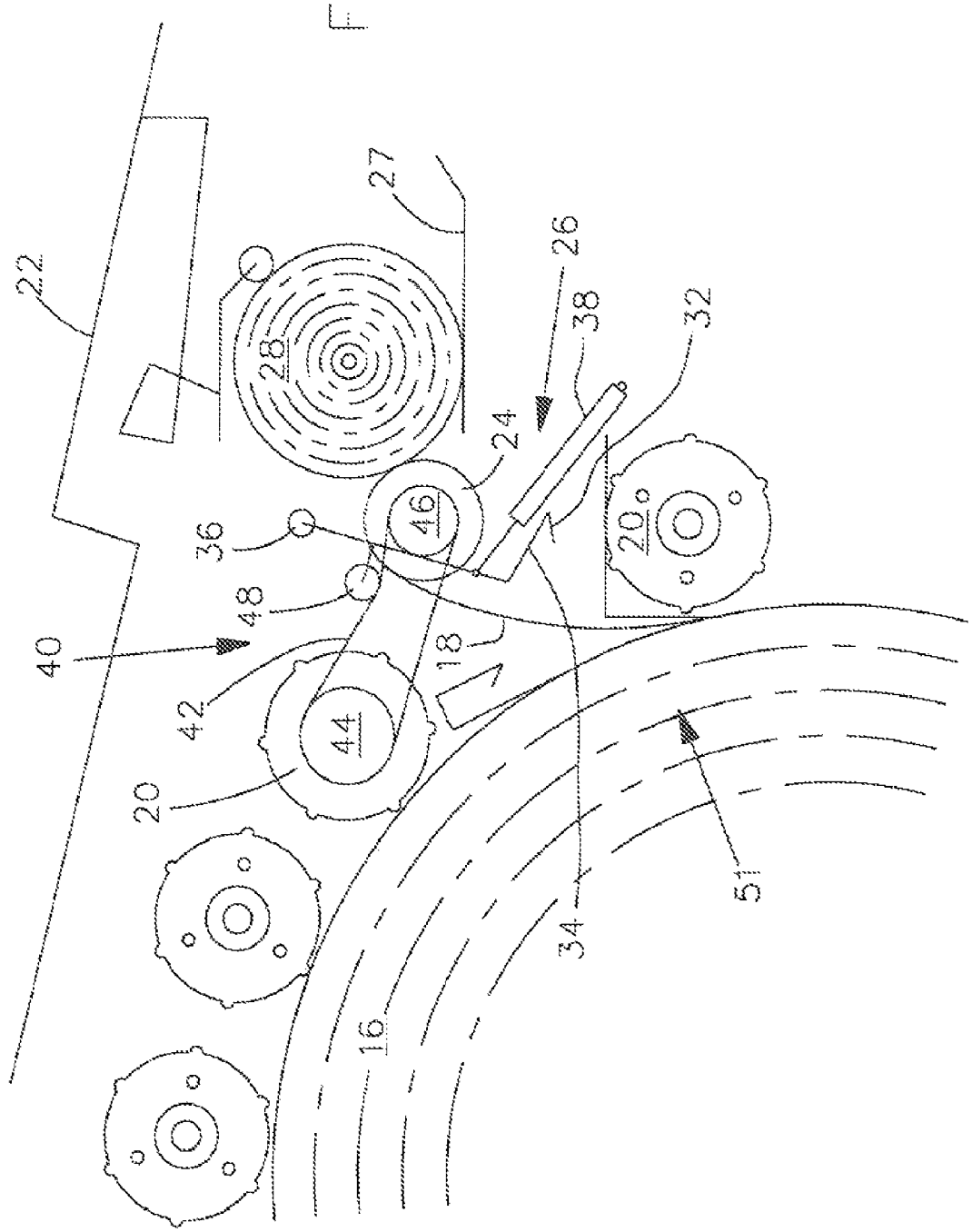
FIG. 2 shows a more precise illustration of the wrapping arrangement of FIG. 1, including a clutch arrangement for the selective drive of a propulsion element.

FIGS. 1 and 2 show a baler 10 of generally conventional configuration with a baling chamber 12. Beyond that, there is provided a wrapping arrangement 14, constructed in accordance with the present invention, for the wrapping of a bale 16 in the baling chamber 12 with an enveloping material 18.

The baler 10 may be any known conventional configuration, that is, with a baling chamber 12 of constant or variable size, that is surrounded exclusively or in combination with belts, chains or, as shown in FIGS. 1 and 2, by fixed rolls 20.

Such a baler 10 may be applied in agriculture for the forming of bales 16 of harvested crop such as, for example, straw, hay or grass. But an application in industrial usage is also conceivable.

In the present embodiment the wrapping arrangement 14 is provided on the front side of the baler 10. The enveloping material 18 is conducted into the balling chamber 12 through a slot between two adjacent roll 20 where it is carried along by the bale 16 that has been brought into rotation. The wrapping arrangement 14 may be arranged in a central region of the baler 10 or ahead of or above the baling chamber 12.

The bale 16 is wrapped by the enveloping material 18 and is thereby prevented from falling apart after leaving the baler 10. The enveloping material 18 may consist of foil, net, woven fabric, paper or the like.

As can best be seen in FIG. 2, the wrapping arrangement 14 is provided with a housing 22, a propulsion roll, designated in the following as propulsion element 24 and a separating arrangement 26. The housing 22 contains a support floor 27 on which the enveloping material 18 is supported in bearings as roll 28. The support floor 27 may also be configured in such a way that it stores several rolls 28 and/or is provided with several steps or cavities for their secure storage.

The propulsion element 24 is in the form of a roll and provided on its circumferential surface with a coating with a high coefficient of friction and can be brought into rotation. Initially the rotation assists in withdrawing the enveloping material 18 from the roll 28. The roll 28 is located above the support plane of the support floor 27 and comes into contact in its operating position with the propulsion element 24 in a region that corresponds approximately to a 6 to 9 o'clock position. The enveloping material 18 is withdrawn from the roll 28 by means of the propulsion element 24 and conducted into the baling chamber 12 through the slot between adjacent rolls 20. During a proper operation, the enveloping material 18 grasped by the rotating bale 16 and envelopes it.

The separating arrangement 26 is provided with a knife 32 that is fastened to an arm 34 pivoting about a bearing 36 in order to enter the enveloping material 18 and to cut through the latter or to the effect its tearing off, when the wrapping process is completed. The knife 32 is pivoted by a hydraulic motor 38 that is actuated by a known control or regulating arrangement (ECU).

Beyond that, a further arm, which carries a belt tensioning pulley 48, is connected to the arm 34, with the position of the arm and, hence, the pulley 48, also being determined by the hydraulic motor 38. In the present embodiment a guide arrangement 51 is provided, free to pivot, about the arm 34. Such a guide arrangement 51 can be derived from U.S. Pat. No. 6,886,307, granted May 3, 2005, whose disclosure is hereby incorporated into the present patent application.

If the hydraulic motor 38 is in its retracted position, as shown in FIG. 2, then the knife 32 is in such a pivoted position that it does not affect the course of the enveloping material 18. Referring now to FIG. 3, it can be seen that the propulsion element 24 operates by means of a drive shaft 39, with which it is rigidly connected, a clutch arrangement 41, and with a drive belt 42. The drive belt 42 is engaged with a first belt drive pulley 44, that interacts with one of the rolls 20, that can be brought into rotation by a drive (not shown), and is engaged with a second belt drive pulley 46 that is applied, free to rotate, to the drive shaft 39. Moreover, it can be seen that the tensioning pulley 48 is disposed so that it may apply more or less pressure to an upper run of the drive belt 42 at a location between the belt drive pulleys 44, 46 in such a way that the drive belt 42 can be tensioned by means of the tensioning pulley 48, in order to bring the second belt drive pulley 46 into rotation. If the tensioning pulley 48 does not apply tension to the drive belt 42, then the second belt drive pulley 46 is not driven by the drive belt 42.

Reference will now be made to FIG. 3, in which the propulsion element 24, the drive shaft 39, the clutch arrangement 41 and the second belt drive pulley 46 are shown in an enlarged view.

The second belt drive pulley 46 is applied by means of a sliding bearing 50, free to rotate, to an end region 52 of the drive shaft 39 spaced away from the propulsion element 24. The second belt drive pulley 46 is connected to a clutch disk 56 by means of a safety device 54, in the form of a screw, the clutch disk is also applied to the end region 52, but is not directly connected to the drive shaft 39.

The safety device 54 is inserted through a hole 58 in the clutch disk 56 and is loaded by a spring 60 in the form of a compression spring provided on the safety device 54 at a location between a head of the device 54 and the clutch disk 56, in such a way that the belt drive pulley 46 is biased towards the clutch disk 56.

Moreover, a clutch element 62 is applied to the drive shaft 39, and is provided with a bearing region 64 that is connected, fixed against rotation, to the end region 52 of the drive shaft 39 by means of an appropriate connection 66, for example, in the form of a feather key.

A clutch region 68 extends from the bearing region 64 between the belt pulley 46 and the clutch disk 56. The clutch region 68 is provided with a high friction coating 70 on its side facing the belt drive pulley 46 as well as the side facing the clutch disk 56.

For the sake of completeness it should be noted that the drive shaft 39 extends further through a bearing 72 in a side wall 74 of the baling chamber 12 and that a spacer bushing 76 is provided between the bearing 72 and the clutch element 62.

In the following, the method of operation of the arrangement 14 shall be described in greater detail. For this purpose, reference is here made to FIG. 1 as well as to FIGS. 2 and 3.

If the formation of the bale 16 in the baling chamber 12 has been completed, which can be determined in known manner by a sensor, not shown, which mechanically or optically determines the diameter of the bale 16, for example, then the wrapping arrangement 14 is activated. This occurs in that the hydraulic motor 38 is brought into its retracted position, shown in FIG. 2, as controlled by the control or regulating arrangement (ECU).

This retraction of the hydraulic motor 38 causes the arm 34 to be swung counter clockwise about the pivot bearing 36, which, in turn, causes to tensioning pulley 48 to effect a tensioning of the drive belt 42 so as to cause the second belt pulley 46 to be brought into rotation.

The belt pulley 46 in turn operates by means of the friction coating 70 facing it as well as indirectly by means of the clutch disk 56 and the friction coating 70 facing it on the clutch element 62 and carries these along or brings the clutch element 62 and with it the drive shaft 39 and the propulsion element 24 into rotation.

The propulsion element 24 that is now driven in rotation withdraws the enveloping material 18 from the roll 28 and conveys it in the direction of the bale 16. The guide arrangement 51 operates here as a support in that it guides the enveloping material 18 to the bale 16.

When the enveloping material 18 is grasped by the rotating bale 16, the bale applies a force to the enveloping material 18. Since provision has been, made for the belt drive 40 to drive the propulsion element 24 with a speed that is less than the rotational speed of the bale 16, preferably by approximately 15% to 30% or even less, the enveloping material 18 is braked by the action of the propulsion element 24 and is thereby stretched or tensioned, regardless of the type, of harvested crop that is processed or in what condition it is. This is desirable in order for the enveloping material 18 to adhere closely to the bale 16 and enclose it tightly.

The clutch arrangement 41 has the effect that the force applied to the enveloping material 18 by the bale 16 and thereby the stretching of the enveloping material 18 remains constant independently of the rotational speed of the bale. If the applied force exceeds a predetermined value, then the clutch element 62 begins to slip relative to the second belt pulley 46 and the clutch disk 56 in such a way that only the predetermined force is applied to the enveloping material 18 and thereby a certain stretching of the latter is attained.

The force that is to be applied or the desired stretching can be charged or predetermined by tightening the safety device 54 to a greater or lesser degree into the second belt pulley 46 against the force of the spring 60 so that the clutch arrangement 41 is preloaded in the desired manner.

Having described the preferred embodiment, it will become apparent that various modifications can be made without departing from the scope of the invention as defined in the accompanying claims.

The invention claimed is:

1. In combination with a large round baler including a baling chamber for forming large round bales and for bringing a bale being formed into rotation at a first circumferential velocity, a wrapping arrangement for enveloping a bale formed in said chamber with an enveloping material, a supply of enveloping material, a driven, cylindrical propulsion element for withdrawing enveloping material from said supply, a drive arrangement being coupled to said propulsion device and including a clutch arrangement effectively connected with said propulsion element for causing said propulsion element to have a circumferential velocity which is less than said first circumferential velocity, the improvement comprising: said clutch arrangement including clutching components being arranged in such a way that a predetermined tensioning force acting upon the enveloping material, when grasped by the rotating bale, remains at least generally constant at a value less than that which would cause an excessive stretching of the enveloping material regardless of a change in a difference between said first circumferential velocity of said bale and said circumferential velocity of said propulsion element.

2. The combination, as defined in claim 1, wherein said circumferential velocity of the propulsion element is at least 10% slower than the circumferential velocity of the bale.

3. The combination, as defined in claim 1, wherein said circumferential velocity of the propulsion element is at least 30% slower than the circumferential velocity of the bale.

4. The combination, as defined in claim 1, wherein said clutching components of said clutch arrangement are arranged so as to define a slip clutch.

5. The combination, as defined in claim 4, wherein said clutch includes an adjustable device for adjusting a force at which said clutch slips.

6. The combination, as defined in claim 1, wherein said drive arrangement includes a belt drive.

7. The combination, as defined in claim 6, wherein said propulsion element is in the form of a roll having one end joined to a drive shaft projecting from one end of said roll; said belt drive including a belt drive pulley mounted for rotating freely about said drive shaft; and said clutch arrangement including a clutch region in the form of a first disk having high friction coatings at its opposite sides and being coupled for rotation with said drive shaft, including a clutch disk located on an opposite side of said first disk from said drive pulley, and including a biasing arrangement biasing said clutch disk toward said belt drive pulley, with the friction coating at opposite sides of the first disk being respectively engaged with said belt drive pulley and with said clutch disk.

8. The combination, as defined in claim 7, wherein said baling chamber is defined, in part, by a driven bale-forming roll; and said belt drive including a second belt drive pulley mounted for being driven by said driven bale-forming roll.

* * * * *